(No Model.)
E. THOMSON.
ELECTRIC POWER TRANSMISSION.
No. 434,488. Patented Aug. 19, 1890.
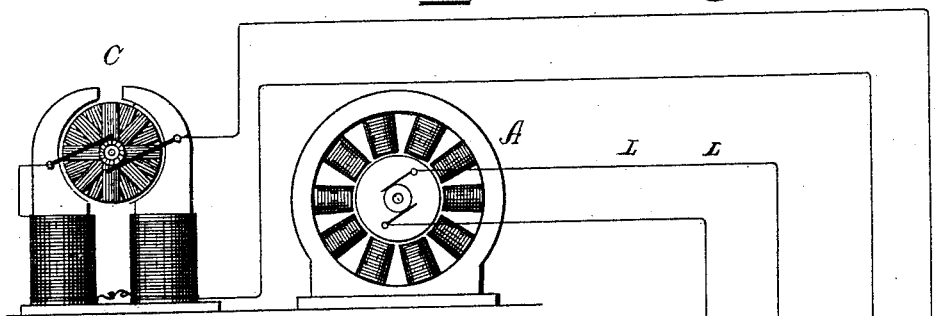
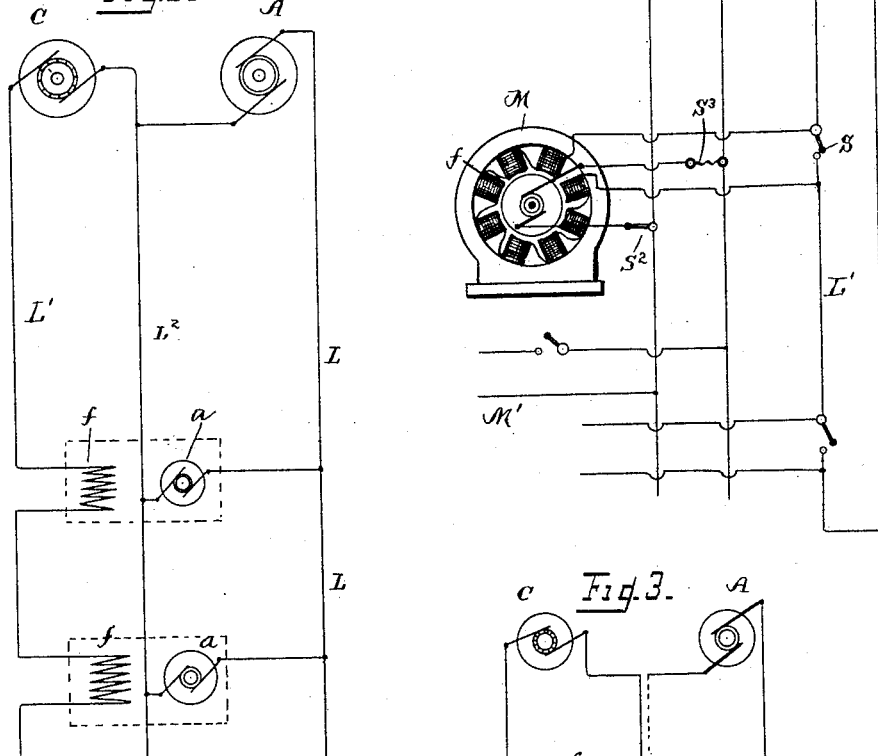
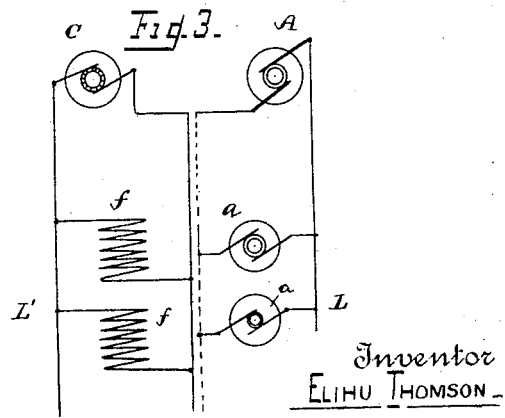
Witnesses
Ira R. Steward,
Wm. H. Capel.
Inventor
Elihu Thomson
By Townsend & MacArthur
Attorneys

UNITED STATES PATENT OFFICE.

ELIHU THOMSON, OF LYNN, MASSACHUSETTS.

ELECTRIC-POWER TRANSMISSION.

SPECIFICATION forming part of Letters Patent No. 434,488, dated August 19, 1890.

Application filed May 7, 1888. Serial No. 273,155. (No model.)

*To all whom it may concern:*

Be it known that I, ELIHU THOMSON, a citizen of the United States, and a resident of Lynn, in the county of Essex and State of Massachusetts, have invented a certain new and useful Electric-Power Transmission, of which the following is a specification.

My present invention relates to the transmission of power by electric currents where the currents which give the mechanical energy are alternating in character.

My invention consists in a novel system of electric-power transmission comprising a feeding main or wire conveying a current which is continuous or unipolar in its character and which is supplied with current from a central station or point, a second main carrying alternating currents supplied from any suitable source, and one or more electric motors at another point fed from said mains and having their armatures connected with the alternating main and their fields connected with the unidirectional-current main.

My invention consists, further, in the particular combinations of mains and manner of supplying the motor armatures and fields therefrom, which will be described, and then more specifically stated in the claims.

In the accompanying drawings, Figure 1 is a diagram of circuits and apparatus embodying my invention. Figs. 2 and 3 are diagrams illustrating modified arrangements.

Referring to Fig. 1, L indicates one or more supply wires or mains connected with a source of alternating currents, such, for instance, as indicated at A.

L' is a second main or mains connected with a source of current which may be conveniently independent of A and which is of proper character to furnish to said main or mains a current that is continuously of the same direction in character. This source (indicated at C) may be constructed to give a current of constant strength or may be a constant potential generator, according to the character of the system.

M indicates one of a number of electric motors constructed to work by electric energy consisting of alternating electric currents. The field-magnets of said motor are indicated at $f$, and are provided with connections to a direct or continuous current main L', as indicated. They may be thrown into the main circuit by means of a switch S, which normally shunts the field-coils. The armature of the electric motor is connected by suitable wires or connections with the alternating supply-wire L, and may be brought into connection therewith by means of a suitable switch $S^2$. The position of the second motor is indicated at M'.

Any number of motor-fields may be fed in series from the main L', and any number of motor-armatures may be connected in multiple from the mains L, according to the capacity of the alternating-current generator.

In each of the branches leading to the motor-armatures a suitable fuse or switch (indicated at $S^3$) is placed to prevent short-circuiting of the mains L. The motor-armatures must always be brought up to speed by any suitable means before throwing the current onto the motor, after which they run at the speed imparted by the impulses, which is of course determined by the character of the main generator A.

Suitable indicators, registers, regulators, &c., may be employed without changing the essential elements of the invention, which, as before explained, comprises, essentially, the use in a single system of the two characters of current—namely, continuous or unidirectional and alternating—in an electric-power system, one serving to produce field magnetization and the other to produce rotation of the motor-armatures when at work.

In the modification indicated in Fig. 2 the mains L L' have a common return-wire $L^2$, making an arrangement similar in appearance to a three-wire system, on one side of which alternating currents only are found, and on the other said direct or continuous currents. The fields $f$ of the motors are, as before explained, arranged in series on the line L', and the armatures of the motors (indicated at $a$) are arranged in multiple.

In the modification indicated in Fig. 3 the unidirectional line L' feeds the field-coils $f$ in multiple. In this case, of course, the generator C would be constructed to deliver a constant potential.

The feeder-lines L L' may obviously have either a common return, as in Fig. 2, or independent returns, as in Fig. 1.

What I claim as my invention is—

1. The combination, substantially as described, in a system of electric-power distribution, of alternating-current mains supplied with alternating currents from a central station, alternating-current electric motors having their armature connected to said mains, and a supplemental continuous-current main or mains supplied also from a central station or generator and connected to the field-magnets of said motors for exciting the same, as and for the purpose described.

2. In a system of electric-power distribution, the combination, substantially as described, of a continuous-current generator, a distributing-circuit leading therefrom, an alternating-current motor or motors at a distant point or points having their exciting-coils connected to said continuous-current main or circuit, an alternating-current generator, a distributing wire or circuit leading therefrom to the same motor or motors, and connections from the armature of such motor or motors to said alternating-current main or circuit, as and for the purpose described.

3. In a system of electric-power transmission, the combination of an alternating-current main supplying the armatures of alternating-current motors in parallel, and a continuous-current main supplying the fields of the alternating motors in series.

4. In a system of electric-power transmission, the combination of an alternating-current-supply main feeding the armatures of alternating-current motors, a unidirectional supply-main feeding the fields of said motors, and a common return for the alternating and unidirectional mains.

Signed at Lynn, in the county of Essex and State of Massachusetts, this 26th day of April, A. D. 1888.

ELIHU THOMSON.

Witnesses:
J. W. GIBBONEY,
E. WILBUR RICE, Jr.